United States Patent [19]

Veal et al.

[11] Patent Number: 4,570,050
[45] Date of Patent: Feb. 11, 1986

[54] ARC WELDING CONTROL SYSTEM

[75] Inventors: Leo D. Veal, Mobile; William R. Castle, Chickasaw, both of Ala.

[73] Assignee: Arc Controls, Inc., Mobile, Ala.

[21] Appl. No.: 735,775

[22] Filed: May 20, 1985

[51] Int. Cl.$^4$ .............................................. B23K 9/06
[52] U.S. Cl. ............................ 219/130.31; 219/130.4; 219/132
[58] Field of Search .......... 219/130.4, 130.31, 130.21, 219/130.33, 132, 137 PS

[56] References Cited

U.S. PATENT DOCUMENTS

| 2,617,913 | 11/1952 | Oestreicher | 219/132 |
| 3,051,829 | 8/1962 | Manz | |
| 3,133,187 | 5/1964 | Anderson | |
| 3,335,317 | 8/1967 | Sciaky | |
| 3,459,996 | 8/1969 | Adamson | |
| 3,609,290 | 9/1971 | Lawrence | |
| 4,100,390 | 7/1978 | Jackson | 219/132 |
| 4,523,077 | 6/1985 | Hoyt, Jr. et al. | 219/130.31 |

Primary Examiner—Clifford C. Shaw

[57] ABSTRACT

An arc welding control system wherein the welding current is held to a very low value during the time a welding electrode is coupled with a workpiece. When the welding electrode is disengaged from the workpiece, a very low current pilot arc is established. Then, arc voltage monitors effect, first, an increase in the current of the pilot arc and then the closing of a welding current contactor. Both shielded metal arc welding and gas tungsten arc welding modes are accommodated; and, in the latter, when a too low arc voltage condition is detected, arc voltage monitors effect the opening of the welding current contactor for such time as the too low arc voltage condition exists. While the welding current contactor is open, a low current pilot arc is maintained until the too low arc voltage condition is corrected.

8 Claims, 3 Drawing Figures

ARC WELDING CONTROL SYSTEM

TECHNICAL FIELD

This invention relates generally to the art of electric arc welding, and more particularly to a control system which substantially eliminates the difficulty of starting a welding arc and starting the welding arc on a targeted spot. It further reduces the potential of a welder accidentally dipping a tungsten electrode into the molten weld metal while in the process of making a weld.

BACKGROUND OF THE INVENTION

Electric arc welding is a well established process, and the present state of the art reflects some 50 or 60 years of progress in most of the hardware and in many of the techniques presently being used. However, the technique of starting an arc and the contribution of the welding power source to this part of the welding process has not changed significantly since the early days of the art.

For reasons of safety, welding power sources used with the various manually applied versions of the electric arc welding process have had their open circuit voltage limited to 100 volts, or less, and in order to start the welding arc, the welder has, since the beginning of the art, scratched or pecked the welding electrode lightly against the workpiece, which creates a spark of sufficient intensity to ionize the area between the end of the electrode and the workpiece. This establishes a low resistance path for the welding power to flow through, and the result is an instantaneous welding arc of full potential which melts both the electrode and the workpiece opposite the electrode which one skilled in the art controls to produce a weld.

The starting of a welding arc appears simple enough to be of little significance. However, those skilled in the art readily acknowledge the difficulty associated with this seemingly simple action. When the welding electrode is scratched or pecked against the workpiece, to start an arc, very high current densities are involved; and if the electrode is not withdrawn quickly enough, a small weld will be formed between the electrode and the workpiece. In order to break this weld, the welder must vigorously bend the electrode from side to side while pulling at the same time. Frequently, this action damages the coating on the electrode enough to make the electrode unusable. Conversely, in an attempt to withdraw the electrode away from the workpiece quickly enough to avoid such welding to the workpiece, the welder often accelerates the withdrawal rate of the electrode from the workpiece such that he does not stop quickly enough and the arc pops out because the length of the conductive path from the electrode to the workpiece is too long to sustain an arc under starting conditions.

Frequently, when welders are welding in the vertical, overhead, or other difficult positions which are encountered routinely in shipyards or on large construction projects, such as oil refineries, power generating plants, chemical plants, or paper mills, welders do experience the aforementioned difficulties in the starting of an arc sufficiently often for it to be a very real problem. In fact, a large percentage of all weld defects originate at the arc starting points.

Another problem which exists when the welder is attempting to start an arc is off-target arc starts. In accordance with the prior art, off-target arc starts arise from the lack of a means of control by the welder over the full welding potential which exists immediately upon contact of the electrode with the workpiece. The problem is compounded by the following facts. The electrode extends out approximately 14" from an electrode holder, which averages around 8" in length and is held by the welder's hand. Since the rays emitted by the arc are harmful and the light created is very bright and intense, the welder's protective shield must be in place over his face for viewing the welding through a very dark lens. Consequently, the welder does not see the exact spot where the arc will start until it is established. Accordingly, many arc starts are considerably off-target, and the workpiece, or adjacent objects, such as electric conduits, instruments, or machine parts, are damaged to the extent that production delays and costly repairs result.

A further problem area of electric welding, but more directly related to the gas tungsten arc welding process where exceptionally high current densities are involved, is the loss of the point of the tungsten electrode when an arc is started by scratching or pecking against the workpiece (the method most commonly used throughout the construction industry) since a piece of the point often welds itself to the workpiece and breaks off and becomes deposited in the weld. This is very undesirable since not only is the welder required to regrind a point on the tungsten, but the weld may fail to pass X-ray examination, necessitating costly repairs. Another source of tungsten deposits in the weld metal, and perhaps the greatest cause of this problem, is the fact that a welder cannot always position himself in relation to the weld to accurately discern the true distance from the point of the tungsten to the molten weld metal, so the welder often accidentally dips the point of the tungsten into the molten weld metal and inadvertently deposits a small piece of the point in the weld.

The aforementioned problems have been recognized by others, and there are many various approaches toward a solution to many of these problems, but apparently no acceptable answer has been found that is simple enough and economical enough to be adapted on a wide scale to shielded metal arc welding or to the field applications of gas tungsten arc welding.

There are several patents present in the art pertaining to welding systems, the most pertinent being:

| U.S. Pat. No. | Title |
| --- | --- |
| 3,133,187 | Touch Starting of Power Arcs |
| 3,774,007 | Welding Apparatus |
| 3,051,829 | Electric Arc Torch Starting |
| 3,459,996 | Starting Circuit For Direct Current Art Welding |
| 3,174,027 | Pilot Arc Starting-Arc Working Systems |
| 8,876,855 | Tungsten Inert Gas Arc Striking Device |
| 3,637,974 | Switching Arrangement For The Stabilization And Ignition Of Welding Arcs And The Like |
| 3,609,290 | Electric Arc Control System |
| 2,504,837 | Welding Rod Holder |
| 3,335,317 | Arc Starting Circuit For Welding Systems |

It is the object of this invention to provide an arc welding control system which effectively solves the problems discussed and provides a degree of control over the welding process which enables welders of all skill levels to perform their art to a higher degree of excellence. This system senses the welding arc as a variable resistance wherein varying the length of the arc produces an equally varying and proportional change in the resistance across the arc. Conversely, a change in the resistance across the arc produces a proportional change in the voltage across the arc which is in keeping with Ohms Law of Proportionality. So, if an ⅛" arc length represented a 20 volt arc, an arc length of more than ⅛" would require somewhat more than 20 volts, and an arc length of less than ⅛" would require somewhat less than 20 volts. It is therefore apparent that a control system which senses the voltage of an arc welding circuit may be designed to effect a switching signal when the voltage of that welding circuit goes above or below certain preselected values.

SUMMARY OF THE INVENTION

This invention comprises a welding control system which includes means for sensing open circuit, shorted circuit, and the circuit conditions which represent a normal welding load. Additionally, the welding control system includes means to prevent the flow of welding current, which normally occurs when a welding electrode touches the workpiece. When the electrode is slightly disengaged from the workpiece, the arc will start in a synchronized sequence of events, progressing from a very low current pilot arc to a pilot arc with greater current strength. Then as the arc is lengthened, the welding control system will sense the voltage rise across the welding circuit. When the voltage across the welding circuit reaches a preselected value, the full welding potential will be switched into the welding circuit, and welding proceeds in a normal manner.

The welding control system accommodates both shielded metal arc welding and gas tungsten arc welding, and in the latter mode the welding control system also includes means for initiating and terminating the flow of a shielding gas to the arc and means to suspend the flow of welding current to the arc if the voltage of the welding circuit falls below a minimum preselected value and further means to provide a pilot arc condition during the time this lower-than-minimum preselected voltage condition exists. Additionally, the control system includes means to instantly restore the full welding potential to the arc when the pilot arc is lengthened sufficiently to raise the voltage of the welding circuit to at least the preselected value.

BRIEF DESCRIPTION OF THE DRAWING

For a further understanding of the nature and objects of the present invention, reference should be made to the following detailed description, taken in conjunction with the accompanying drawings, in which like parts are given like reference and wherein.

DETAILED DESCRIPTION OF THE DRAWINGS

Figure 1:
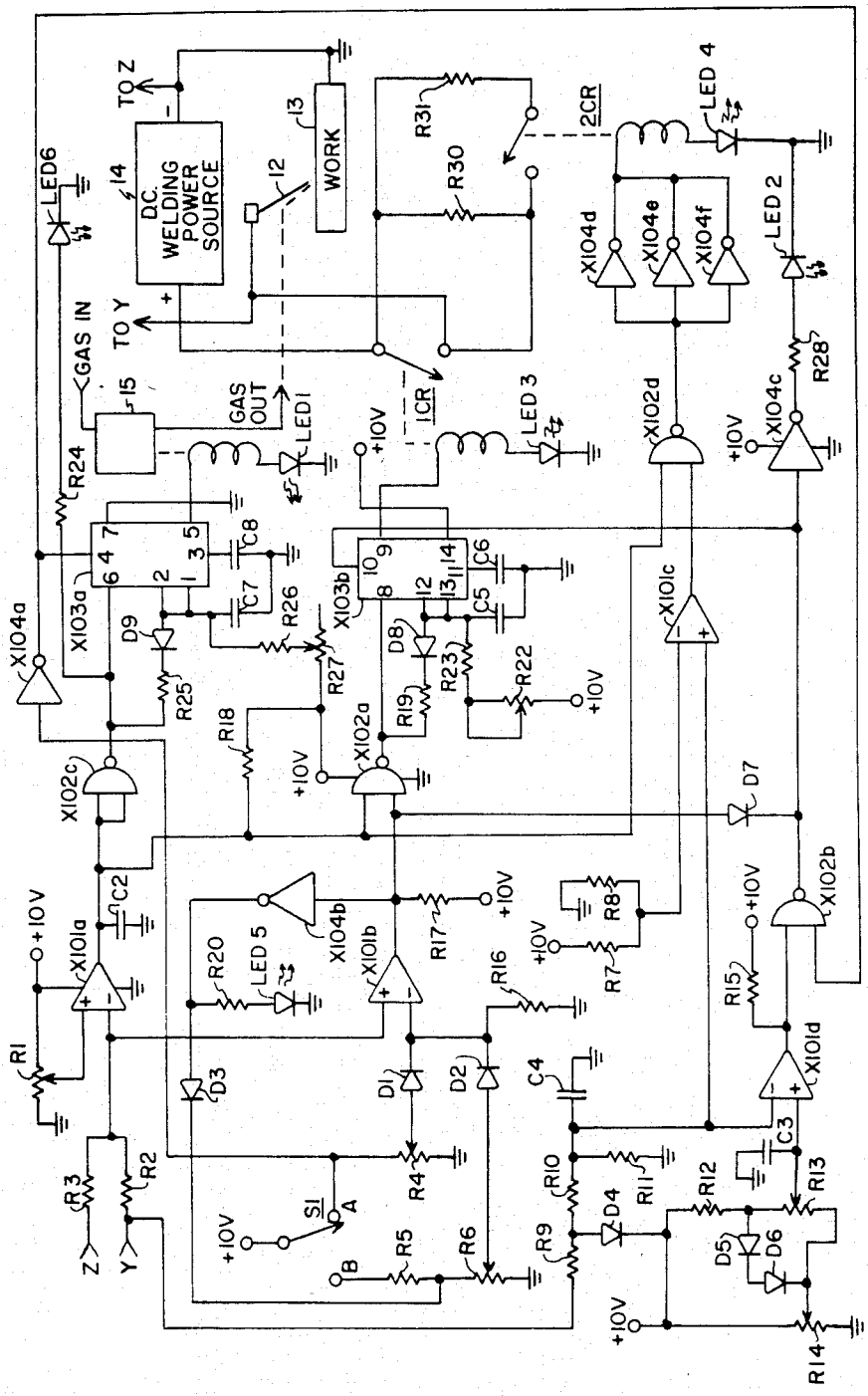
FIG. 1 is a schematic of the preferred embodiment of the welding control system 16.
Figure 3:
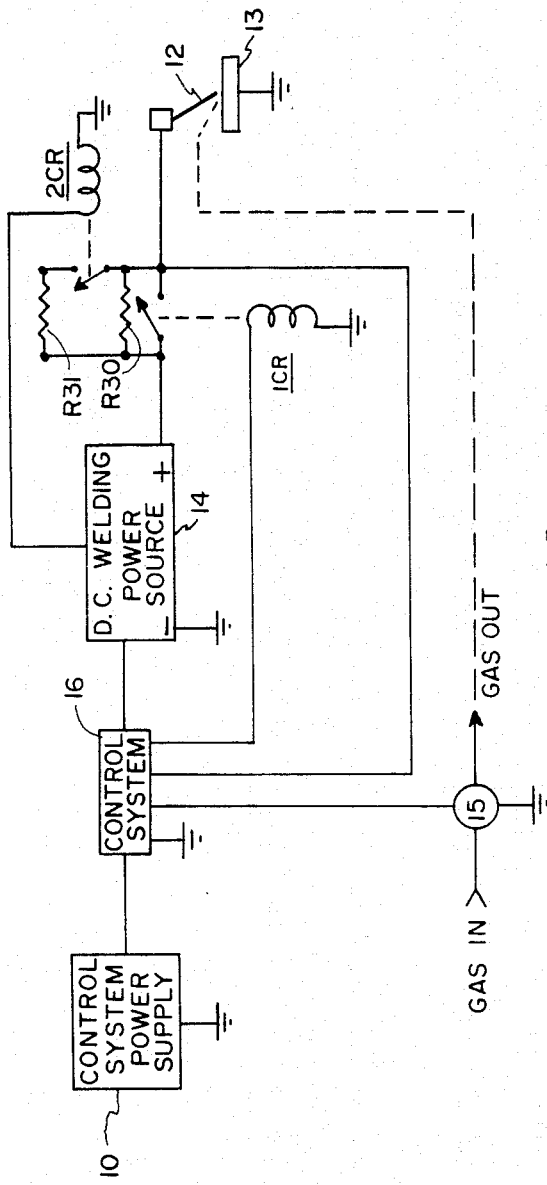
FIG. 3 is a block diagram of the welding control system 16 with a direct current welding power source 14 and the welding control system power supply 10.

When mode selector switch S1 is set at position A for shielded metal arc welding (SMAW), the following components are either inactive or may be ignored for shielded metal arc welding:

(1) X104a and X104c which are each 1/6 of a hex inverter IC;
(2) X103a which is ½ of a 556 dual timer IC;
(3) X102c which is ¼ of a quad 2 input NAND gate IC;
(4) X101d which is ¼ of a quad Op-Amp voltage comparator IC;
(5) gas control valve 15.

Additionally, all of the resistors, capacitors, and diodes connected to these components are either passive or may be disregarded for the present. They will, however, be referenced under the explanation of mode selector switch S1 set at position B for gas tungsten arc welding (GTAW).

Referring now to the drawings, when welding electrode 12 is placed in contact with workpiece 13, a shorted condition of the welding circuit will exist, causing the welding circuit voltage to drop to almost zero for the duration of the contact, and a current of 2 amperes will pass from welding power source 14 through resistor R30 which provides a welding circuit bypass around welding current contactor 1CR. Then Op-Amp X101a, which functions as a voltage comparator and is at a logic low condition while the welding circuit voltage is above 60 volts, now goes to a high condition by means of comparing the voltage of the welding circuit with a fixed reference voltage and determining a differential which effects the switching of low to high. Resistor R1, which is connected across the output of welding control system power supply 10, provides the fixed reference voltage value to the non-inverting pin of this Op-Amp, and the inverting pin of this Op-Amp is connected to the voltage divider network formed by resistors R2 and R3 which are connected across the welding circuit.

At the instant of disengagement of aforementioned welding electrode 12 from workpiece 13, a low current pilot arc is established through resistor R30; and as welding electrode 12 is further withdrawn from workpiece 13, the voltage across the welding circuit will continue to increase. When this voltage reaches 2 volts (which occurs when electrode 12 is a distance of 0.003 inch to 0.004 inch from workpiece 13), Op-Amp X101c, which has remained at a logic low up to this time, will now be triggered high by means of comparing the welding circuit voltage as seen through resistors R9, R10, and R11, with the fixed reference voltage furnished by resistors R7 and R8 which are connected across control system power supply 10 and responding to the differential.

Diode D4, connected as shown in FIG. 1, limits the voltage rise at that point of the circuit to 10 volts by interacting with zener diode Z1 in control system power supply 10. Remember that Op-Amp X101a is already high to one input of NAND gate X102d. Now the high from Op-Amp X101c provides a high at the other input, so NAND gate X102d will now go to a logic low, causing hex inverters X104d, X104e, and X104f to go high and energize relay 3CR which will parallel resistors R30 and R31. This raises the current flow to the pilot arc to approximately 10 amperes. As welding electrode 12 is still further withdrawn from workpiece 13, the voltage rise across the arc continues to increase; and at a distance of 0.090 inch to 0.125 inch, the voltage across the welding circuit will average 18 volts to 20 volts, and Op-Amp X101b, sensing the welding circuit voltage is at least 18 volts, will now go high (the trigger point for this low to high is adjustable) by means of comparing the welding circuit voltage as seen through resistors R2 and R3 with the fixed reference voltage provided by resistor R4 which is connected across control system power supply 10 and responding to the differential. With Op-Amp X101a already high, NAND gate X102a, now having a high at both inputs, will go to a logic low, taking the trigger input of 556/X103b low, causing its output to go high, which energizes welding current contactor 1CR, thus placing the full welding potential across the arc, and welding then proceeds in a normal manner.

Resistor R21, on the output of Op-Amp X101c, is for pull up only as are resistors R17, R18, and R15 on the outputs of Op-Amp X101b, X101a, and X101d, respectively. Op-Amp X101b is operatively connected to Op-Amp X101a to form a welding circuit voltage window comparator. Op-Amp X101a switches from low to high when the welding circuit voltage is less than 60 volts, and Op-Amp X101b switches from low to high when said welding circuit voltage is equal to or above 18 volts. Diodes D1 and D2, shown in circuit with Op-Amp X101b, provide blocking as required while resistor R16 provides a pull down load for these diodes.

With switch S1 placed in position B for gas tungsten arc welding (GTAW), note the changes in the circuitry. Hex inverter X104a will now go high and remain in that state while switch S1 is in position B, whereas up to now it has maintained a logic low at the reset pin of 556/X103a, which prevented this component from being triggered on. NAND gate X102c, which is connected as an inverter, now provides a logic low to the trigger pin of 556/X103a any time Op-Amp X101a goes high. So when electrode 12 is placed in contact with workpiece 13, creating a short circuit condition, it will cause the voltage across the welding circuit to drop to near zero. This drop from open circuit voltage (above 60 volts) to near zero volts across the welding circuit causes Op-Amp X101a to go high (previously described with switch S1 set at position A). Then NAND gate X102, being connected as an inverter, goes low, triggering on 556/X103a, which then energizes gas control valve 15. Also, when Op-Amp X101a goes high by means just described, this high condition is then also seen at NAND gates X102a, X102c, and X102d. The reference voltage to the inverting pin of Op-Amp X101b is now provided by means of fixed resistor R5 and variable resistor R6 which are connected in series across control system power supply 10. This new reference voltage value effectively establishes a new voltage value at which the welding circuit voltage will cause Op-Amp X101b to go high. The new welding circuit voltage value at which Op-Amp X101b switches from a logic low to high is now 12 volts instead of the 18-volt value that was established for shielded metal arc welding. However, it should be noted that the starting of a welding arc is the same for both GTAW and SMAW modes of welding.

Additionally, when switch S1 is placed in position B, a new control circuit is activated which will effect a temporary opening of welding current contactor 1CR. If, while a welder is welding and the voltage of the welding circuit goes below a pre-selected minimum value indicating the arc length is too short and consequently the tungsten electrode is too close to the molten weld metal, then Op-Amp X101d instantly goes high and NAND gate X102b, already having a high at one input from hex inverter X104a, will now go low to the reset pin of 556/X103b, causing the output of this component to be suspended, thus de-energizing welding current contactor 1CR until the lower than pre-selected minimum voltage conditions of the welding circuit is corrected.

The reference voltage for Op-Amp X101d is provided through the resistor network formed by resistors R12, R13, and R14 which are connected across welding control system power supply 10. Diodes D5 and D6 function in series to provide a precision voltage drop across resistor R13. When Op-Amp X101d goes high, NAND gate X102b will go low by means of the high from Op-Amp X101d and a high from hex inverter X104; and tracing the output of NAND gate X102b to the reset pin of 556/X103b, it can be seen that 556/X103b will reset and go low, causing welding current contactor 1CR to go to an open condition for as long as the voltage across the welding current remains below the preselected minimum value. However, while welding current contactor 1CR is in an open condition, a pilot arc is maintained by means of resistors R30 and R31 which remain paralleled. While NAND gate X102b is low, diode D7 is forward biased and will conduct, pulling Op-Amp X101b low; then hex inverter X104b goes high. Now, diode D3, which is normally reverse biased and blocking, will conduct and create a hysteresis or dead band effect of the reference point set by resistors R5 and R6. This prevents Op-Amp X101b from going high until electrode 12 is withdrawn from workpiece 13 sufficiently to create at least a 12-volt arc which is seen as the welding circuit voltage. The aforementioned hysteresis or dead band range prevents the rapid oscillation between off and on of the welding current contactor 1CR.

When the welder withdraws electrode 12 from workpiece 13 sufficiently to raise the voltage across the welding circuit to at least the pre-selected minimum value, Op-Amp X101d instantly goes low and NAND gate X102b goes high, removing the reset signal at 556/X103b and reverse biasing diode D7 so that Op-Amp X101b can now go high as soon as the welder lifts electrode 12 from workpiece 13 sufficiently to increase the voltage across the welding circuit to a pre-selected 12-volt value. Then (remembering Op-Amp X101a has remained high), NAND gate X102a will go low and trigger on 556/X103b which will re-energize welding current contactor 1CR, thus re-establishing the full welding potential at the arc. When the welder terminates the arc, 556/X103a provides a time delay (variable) before the shielding gas to electrode 12 is cut off. This time delay is established through the RC circuit formed by resistors R26 and R27 and capacitor C7. Diode D9 and resistor R25 simply provide a clamping action which prevents capacitor C7 from charging until the arc is terminated. Op-Amp X101b remains in the high condition when the arc is terminated; however, Op-Amp X101a goes low, then NAND gate X102c goes high, which reverse biases diode D9. This cuts off diode D9 and permits capacitor C7 to charge. The actual time delay provided before 2CR is deenergized to turn off the gas control solenoid valve is determined by the setting of variable resistor R27. While the resistor and capacitor values of the individual halves of the 556 timer, shown as X103a and X103b, may differ somewhat to achieve different RC times, the circuits are essentially the same, so the foregoing explanation of how timer 556/X103a functions to maintain the flow of the shielding gas for a preselected time after the arc is terminated is also descriptive of how timer 556/X103b functions in a like manner to provide a delay in the opening of the welding contactor 1CR for ½ second (adjustable) after the arc is terminated.

Figure 2:
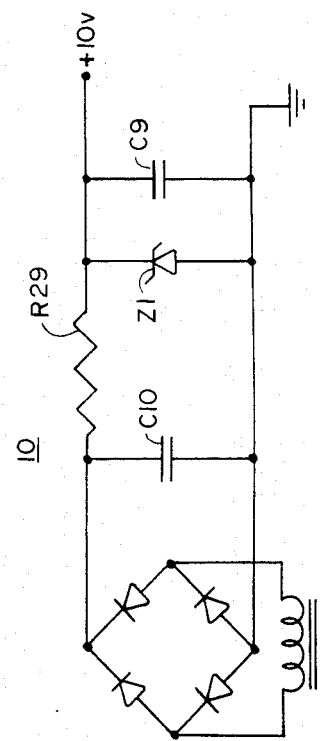
FIG. 2 is a schematic of the welding control system power supply 10.

Capacitors C5 and C7 are each part of an RC timing control. All other capacitors in this control system are for voltage spike trimming or for modifying the rate of change in their respective circuits. The light emitting diodes in the system are just to simplify assembly adjustments and to provide a quick reference means when needed by service technicians. Power supply 10 (FIG. 2), which is of a very common design, should require no detailed description.

The drawings have been described in the context of both SMAW and GTAW, and those skilled in the art will recognize that, while the withdrawing of an electrode from the work (as it is done in starting an arc) has been described as occurring in certain increments of electrode to work distance, it is well known that the logic gates and Op-Amp components used in the subject circuitry switch or change state in less than 20 microseconds (disregarding the capacitors that have been placed in the circuit to filter voltage spikes or to modify the rate of change slightly), so the welder actually withdraws the electrode from the work at a rate that is normal and consistent with his prior experience.

Because many varying and different embodiments may be made within the scope of the invention concept herein taught, and because many modifications may be made in the embodiments herein detailed in accordance with the descriptive requirements of the law, it is to be understood that the details herein are to be interpreted as illustrative and not in a limiting sense.

What is claimed is:

1. An arc welding system comprising:
    a welding power source;
    a welding control system including pilot arc means, operatively associated with the first and second terminals of said welding power source, said welding control system further including:
        current limiting means operatively in series with one of said first and second terminals of said welding power source and further operatively in parallel with a welding current contactor means wherein said current limiting means allows a pre-determined current of less than 4 amperes to pass from said welding power source to a welding electrode while said welding electrode is coupled with a workpiece, said welding control system further including:
        voltage sensing means effecting a plurality of switching signals in a pre-determined sequence in response to the sensing of a like plurality of pre-determined voltage values produced across the welding circuit during the starting of a welding arc and in subsequent welding operations, said voltage sensing means effects a first said switching signal of said plurality of switching signals when said welding electrode is coupled with said workpiece, causing a drop in the voltage across the welding circuit to a value that is at least equal to a first pre-determined value, and a second switching signal of said plurality of switching signals is effected when said welding electrode is withdrawn from contact with said workpiece, causing a rise in the voltage across the welding circuit to a value that is at least equal to a second pre-determined value, and a third switching signal of said plurality of switching signals is effected when said welding electrode is withdrawn still further from said workpiece, causing a further rise in the voltage across the welding circuit to a value that is at least equal to a third pre-determined value, and
        pilot arc means operatively responsive to at least said first and second switching signals of said plurality of switching signals; and
    welding current contactor means operatively responsive to at least a third said switching signal of said plurality of switching signals which causes said welding current contactor means to go to a closed state, and said welding current contact means is further responsive to at least a fourth switching signal of said plurality of switching signals which causes it to go to an open state within a pre-determined time lapse after the welding arc is terminated.

2. The improvement of claim 1 wherein the current and voltage for said pilot arc comprises only a controlled portion of that regular current and voltage as provided for welding by said welding power source.

3. The improvement of claim 2 wherein said pilot arc means comprises a plurality of stages.

4. The improvement of claim 3 wherein each stage of said plurality of stages has current limiting means operatively associated with each other.

5. The improvement of claim 1 wherein the pre-selection to weld in the gas tungsten arc mode establishes means for suspending the welding current to an arc in response to a switching signal effected by said voltage sensing means when the voltage across the welding circuit goes below a pre-selected value.

6. The improvement of claim 5 wherein the pre-selection to weld in the gas tungsten arc mode additionally provides means for varying the value of the welding circuit voltage at which said suspension of the welding current to the arc is effected.

7. The improvement of claim 5 wherein the pre-selection to weld in the gas tungsten arc mode additionally provides means for a pilot arc to be maintained during the time said welding current to an arc is suspended, said suspension being in response to a switching signal effected by said voltage sensing means when the voltage across the welding circuit goes below a pre-selected value.

8. The improvement of claim 5 wherein the pre-selection to weld in the gas tungsten arc mode additionally provides means to restore said welding current to an arc in response to a switching signal effected by said voltage sensing means when the voltage across the welding circuit is returned to at least said pre-selected value.

* * * * *